United States Patent
Okada

(10) Patent No.: US 9,130,441 B2
(45) Date of Patent: Sep. 8, 2015

(54) BRUSHLESS DC MOTOR

(75) Inventor: Takeshi Okada, Kyoto (JP)

(73) Assignee: Nidec Techno Motor Holdings Corporation, Kyoto (JP)

(*) Notice: Subject to any disclaimer, the term of this patent is extended or adjusted under 35 U.S.C. 154(b) by 233 days.

(21) Appl. No.: 13/361,274

(22) Filed: Jan. 30, 2012

(65) Prior Publication Data

US 2012/0194024 A1 Aug. 2, 2012

(30) Foreign Application Priority Data

Feb. 1, 2011 (JP) ................. 2011-019888

(51) Int. Cl.
*H02K 1/28* (2006.01)
*H02K 29/03* (2006.01)
*H02K 1/27* (2006.01)
*H02K 29/08* (2006.01)

(52) U.S. Cl.
CPC ............... *H02K 29/03* (2013.01); *H02K 1/278* (2013.01); *H02K 1/28* (2013.01); *H02K 29/08* (2013.01); *H02K 2213/03* (2013.01)

(58) Field of Classification Search
CPC ................................ H02K 1/278; H02K 1/28
USPC ............ 310/156.01, 156.08, 156.12, 156.13, 310/156.21, 156.23, 156.26, 156.28, 310/156.29, 156.31, 156.38, 156.46, 310/156.55, 156.77
IPC ....................................................... H02K 1/27
See application file for complete search history.

(56) References Cited

U.S. PATENT DOCUMENTS

| | | | | |
|---|---|---|---|---|
| 2,299,589 A * | 10/1942 | Reis | ......................... | 310/156.59 |
| 4,417,167 A * | 11/1983 | Ishii et al. | ................... | 310/67 R |
| 4,748,359 A * | 5/1988 | Yahara et al. | ............ | 310/156.13 |
| 5,488,260 A * | 1/1996 | Heyraud | ................... | 310/156.23 |
| 6,628,034 B2 * | 9/2003 | Jang et al. | ..................... | 310/210 |
| 7,687,957 B2 * | 3/2010 | Ochiai et al. | ............. | 310/156.08 |
| 7,839,045 B2 * | 11/2010 | Wu et al. | ................... | 310/156.48 |
| 2004/0140725 A1 * | 7/2004 | Takahashi | ................ | 310/156.21 |
| 2011/0043071 A1 * | 2/2011 | Mizukami et al. | ..... | 310/216.121 |
| 2012/0025655 A1 * | 2/2012 | Yang et al. | ............... | 310/156.38 |

FOREIGN PATENT DOCUMENTS

| | | | |
|---|---|---|---|
| JP | 8-98488 A | | 4/1996 |
| JP | 9-205747 A | | 8/1997 |

(Continued)

OTHER PUBLICATIONS

Machine Translation, Shiga, JP 2003299282 A, Oct. 17, 2003.*

*Primary Examiner* — Thomas Truong
(74) *Attorney, Agent, or Firm* — Keating & Bennett, LLP

(57) ABSTRACT

A brushless DC motor includes a plurality of permanent magnet segments arranged on an outer circumferential surface of a yoke member. Each of the permanent magnet segments includes a thinnest portion positioned in a circumferential center portion of each of the permanent magnet segments, thickest portions positioned in circumferential opposite end portions of each of the permanent magnet segments, and gradually changing portions positioned between the thinnest portion and the thickest portions. The gradually changing portions have a thickness gradually increasing from the thinnest portion toward the thickest portions. A border between the magnetic poles is positioned in the circumferential center portion of each of the permanent magnet segments.

9 Claims, 12 Drawing Sheets

(56) References Cited

FOREIGN PATENT DOCUMENTS

| | | | |
|---|---|---|---|
| JP | 2002-34188 A | | 1/2002 |
| JP | 2003299282 A | * 10/2003 | ............... H02K 1/27 |
| JP | 2004-88855 A | | 3/2004 |
| JP | 2005-124368 A | | 5/2005 |
| JP | 2010-166689 A | | 7/2010 |
| WO | WO 2009113311 A1 | * | 9/2009 |

* cited by examiner

BRUSHLESS DC MOTOR

BACKGROUND OF THE INVENTION

1. Field of the Invention

The present invention relates to a brushless DC motor.

2. Description of the Related Art

There is conventionally known a brushless DC motor including a rotor formed by attaching permanent magnets to the outer circumferential surface of a cylindrical yoke member with an adhesive agent or the like and a stator arranged to surround the outer circumference of the rotor (see, e.g., Japanese Patent Application Publication No. 2002-034188). In such a motor, the respective permanent magnets are magnetized with an N pole or an S pole and the N-pole-magnetized permanent magnets and the S-pole-magnetized permanent magnets are alternately arranged in the circumferential direction of the rotor. A brushless DC motor is typically provided with a position detecting sensor for detecting the position of a rotor. In a conventional brushless DC motor disclosed in, e.g., Japanese Patent Application Publication No. 2005-124368, three Hall integrated circuits (ICs) are arranged radially outward of a rotor as position detecting sensors. The rotating position of the rotor is detected using the magnetic flux waveforms detected by the respective Hall ICs.

SUMMARY OF THE INVENTION

A brushless DC motor in accordance with a preferred embodiment of the present invention includes a stator and a rotor having an outer circumferential surface surrounded by the stator. The rotor preferably includes a yoke member and a permanent magnet unit. The yoke member includes a cylindrical outer circumferential surface. The permanent magnet unit includes a plurality of permanent magnet segments arranged on the outer circumferential surface of the yoke member in a mutually adjoining relationship in a circumferential direction. Each of the permanent magnet segments preferably includes a thinnest portion, thickest portions, and gradually changing portions. The thinnest portion is positioned in a circumferential center portion of each of the permanent magnet segments. Each of the permanent magnet segments has a smallest thickness in the thinnest portion. The thickest portions of the permanent magnet segments are preferably positioned in circumferential opposite end portions of each of the permanent magnet segments. Each of the permanent magnet segments has a greatest thickness in the thickest portions. The gradually changing portions of the permanent magnet segments are positioned between the thinnest portion and the thickest portions. Each of the permanent magnet segments has a thickness gradually increasing from the thinnest portion toward the thickest portions. The permanent magnet unit has an outer circumferential surface magnetized such that an N pole and an S pole as magnetic poles are alternately arranged in a circumferential direction of the permanent magnet unit and further that the border between the magnetic poles is positioned in the circumferential center portion of each of the permanent magnet segments.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
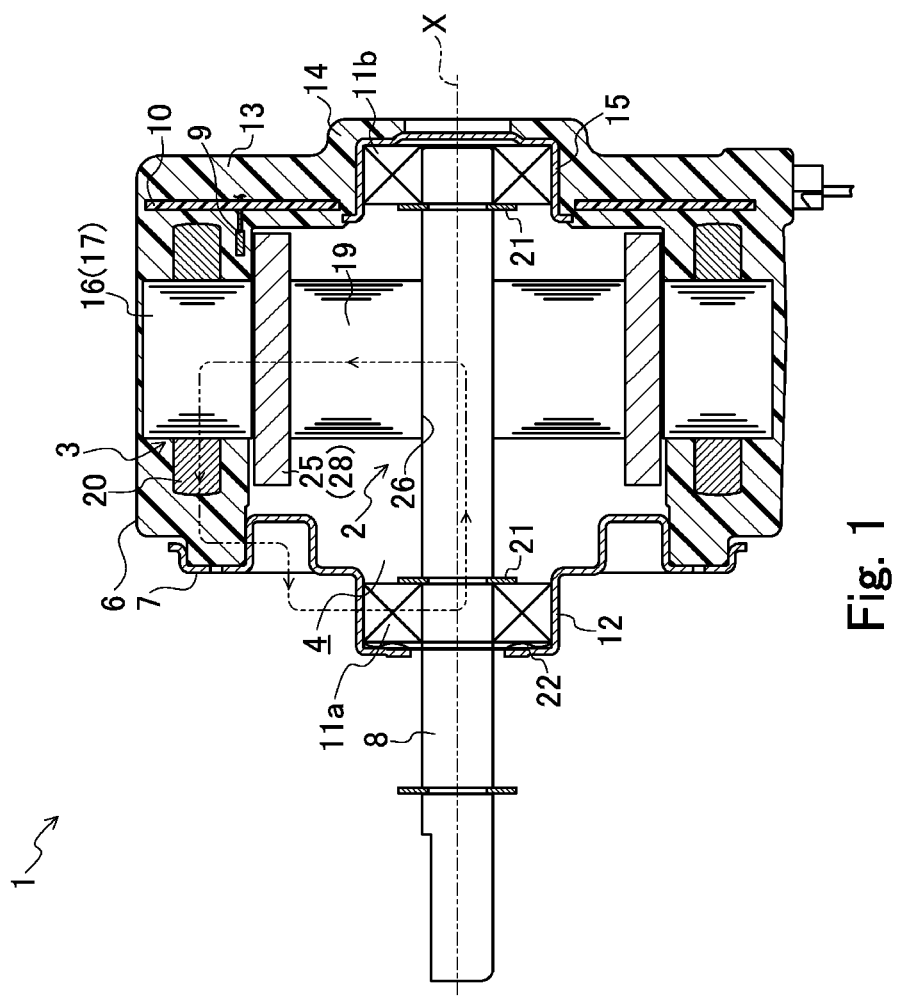
FIG. 1 is a section view of a brushless DC motor according to a first preferred embodiment of the present invention, which is taken along the axis of a shaft.

A brushless DC motor according to one of the preferred embodiments of the present invention includes a stator and a rotor having an outer circumferential surface surrounded by the stator. The rotor preferably includes a yoke member and a permanent magnet unit. The yoke member has a cylindrical outer circumferential surface. The permanent magnet unit preferably includes a plurality of permanent magnet segments arranged on the outer circumferential surface of the yoke member in a mutually adjoining relationship in a circumferential direction. Each of the permanent magnet segments preferably includes a thinnest portion, thickest portions, and gradually changing portions. The thinnest portion is preferably positioned in a circumferential center portion of each of the permanent magnet segments. Each of the permanent magnet segments has a smallest thickness in the thinnest portion. The thickest portions are positioned in circumferential opposite end portions of each of the permanent magnet segments. Each of the permanent magnet segments has a greatest thickness in the thickest portions. The gradually changing portions are positioned between the thinnest portion and the thickest portions. Each of the permanent magnet segments has a thickness gradually increasing from the thinnest portion toward the thickest portions. The permanent magnet unit has an outer circumferential surface magnetized such that an N pole and an S pole as magnetic poles are alternately arranged in a circumferential direction of the permanent magnet unit and further that the border between the magnetic poles is positioned in the circumferential center portion of each of the permanent magnet segments.

With this configuration, the border between the N pole and the S pole on the outer circumferential surface of the permanent magnet unit is positioned in the circumferential center portion of each of the permanent magnet segments. Thanks to this feature, even if the bonding positions of the permanent magnet segments with respect to the yoke member are deviated in the circumferential direction, no gap is generated in the border between the N pole and the S pole (i.e., at the changing point of the magnetic poles). The positional relationship between the N pole and the S pole in the circumferential direction is kept intact. In the present invention, therefore, the accuracy with which the border between the magnetic poles is detected by a position detecting sensor depends on the magnetizing accuracy of the permanent magnet segments and the shaping accuracy (i.e., a machining accuracy) of the thinnest portion rather than the bonding accuracy of the permanent magnet segments to the yoke member. Since the magnetizing accuracy and the shaping accuracy of the permanent magnet segments are typically much higher than the bonding accuracy of the permanent magnet segments, it is possible to increase the accuracy with which the border between the magnetic poles is detected by the position detecting sensor such as a Hall element or the like as compared with conventional motors. Furthermore, it is possible to increase the accuracy of detecting the position of the rotor.

Since the border between the permanent magnet segments becomes a magnetic pole center, the easy magnetized directions of the permanent magnet unit are angled circumferentially outward from the magnetic pole center when seen in the axial direction of the rotor. Therefore, although the peak value of the magnetic flux decreases, it is possible to increase the tertiary component of the magnetic flux, thereby increasing the total magnetic flux. This makes it possible to enhance the output power of the motor without incurring any increase in the cost of the motor.

With the brushless DC motor of the preferred embodiments of the present invention, each of the permanent magnet segments includes the thinnest portion positioned in the circumferential center portion thereof, the thickest portions positioned in the circumferential opposite end portions thereof, and the gradually changing portions positioned between the thinnest portion and the thickest portions. The radial thickness of the gradually changing portions is gradually increased from the thinnest portion toward the thickest portions. The border between the magnetic poles is positioned in the circumferential center portion of each of the permanent magnet segments. This makes it possible to increase the output power of the motor while also enhancing the accuracy with which the position of the rotor is detected by the position detecting sensor.

Preferred embodiments of the present invention will now be described with reference to the accompanying drawings.

First Preferred Embodiment

FIG. 1 is a section view of a brushless DC motor 1 (hereinafter referred to as "motor 1") according to a first preferred embodiment of the present invention. The motor 1 preferably includes a rotor 2 and a stator 3 surrounding the outer circumference of the rotor 2.

The motor 1 preferably further includes a motor casing 6 and a bracket cover 7. The motor casing 6 is preferably of a closed-bottom cylindrical shape. The motor casing 6 has a storage space 4 to store the rotor 2. The motor casing 6 is preferably made of, e.g., a resin. The bracket cover 7 is arranged to cover the open side of the motor casing 6. The bracket cover 7 is preferably made of, e.g., a metal. A position detecting sensor 9 arranged to detect the rotating position of the rotor 2 is arranged radially outward of the rotor 2. For example, a Hall element or a Hall integrated circuit (i.e., a Hall IC) is preferably used as the position detecting sensor 9. The position detecting sensor 9 is connected to a control circuit provided in a control board 10. The position detecting sensor 9 generates a position detecting signal based on a detected magnetic flux waveform and transmits the position detecting signal to the control circuit.

A shaft 8 is fixed to the rotor 2 to rotate together with the rotor 2. The shaft 8 is rotatably supported by a pair of bearings 11a and 11b. The bearing 11a is preferably, for example, press-fitted and fixed to a cylinder portion 12 of the bracket cover 7. A wave washer 22 is preferably provided between one end surface of the bearing 11a and the bracket cover 7. The bearing 11b is preferably, for example, press-fitted and fixed to a cylindrical boss portion 14 defined in a bottom wall 13 of the motor casing 6. A metal bearing bracket 15 is preferably arranged between the bearing 11b and the cylindrical boss portion 14. Snap rings 21 are fixed to the shaft 8. The snap rings 21 make contact with the end surfaces of the bearings 11a and 11b, respectively.

The motor casing 6 covers the stator 3. The motor casing 6 is preferably provided with the stator 3 as a single piece through, for example, molding. However, the inner circumferential surface of the stator 3 is exposed toward the storage space 4. The control board 10 is arranged in the bottom wall 13 of the motor casing 6. The control board 10 is preferably covered with, for example, a molding resin. Stator coils 20 are electrically connected to the control board 10. The control board 10 preferably includes, for example, an inverter circuit, a control circuit, and so forth. Responsive to the position detecting signal fed from the position detecting sensor 9, the control circuit PWM-controls (controls though Pulse Width Modulation) the inverter circuit, thereby performing rotation control of the motor 1.

The stator 3 preferably includes a stator core 16. The stator core 16 is preferably formed by stacking a plurality of steel plates punched into a specified shape one above another, but any other type of stator core forming method could be used instead. The stator core 16 is preferably of an annular shape. The stator core 16 preferably includes a plurality of teeth portions 17 arranged in the circumferential direction. The stator coils 20 are wound about the respective teeth portions 17 through an insulator.

Figure 2:
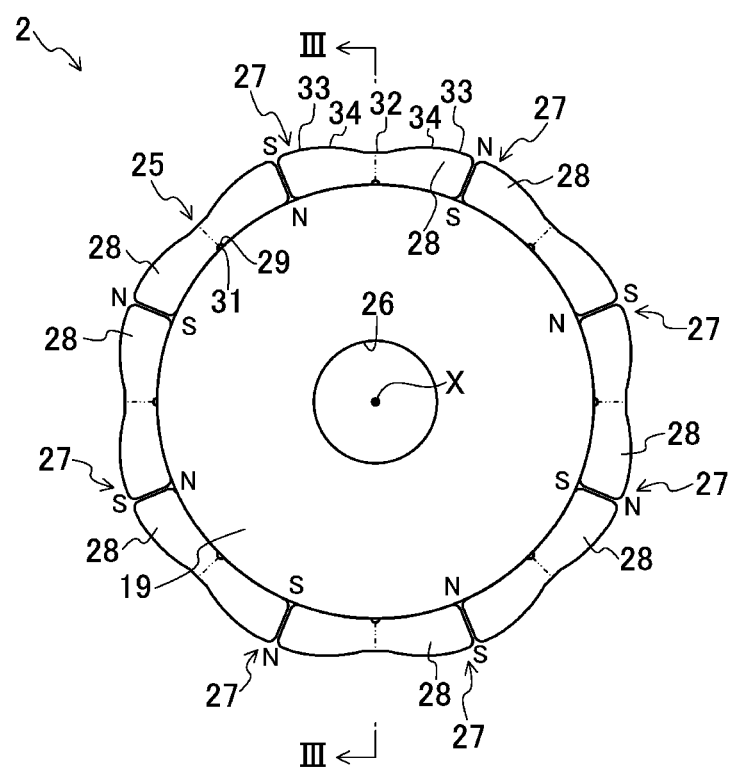
FIG. 2 is an axial plan view showing a rotor included in the brushless DC motor according to the first preferred embodiment.
Figure 3:
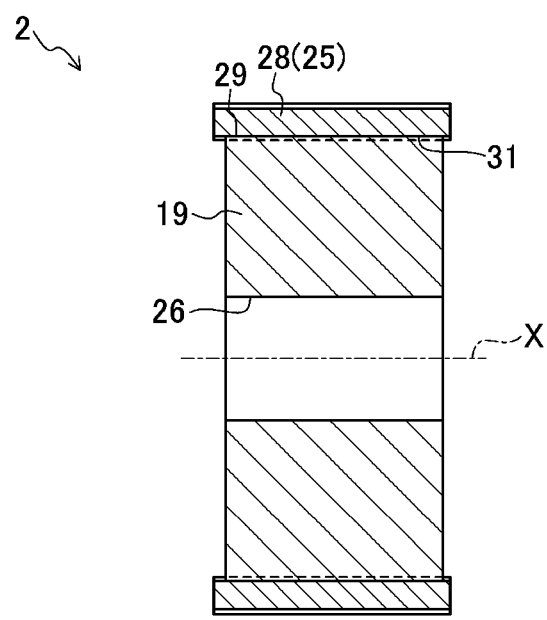
FIG. 3 is a section view taken along line III-III in FIG. 2.

Referring to FIGS. 2 and 3, the rotor 2 preferably includes a yoke member 19 and a permanent magnet unit 25. The yoke member 19 has a cylindrical outer circumferential surface. The permanent magnet unit 25 is fixed to the outer circumferential surface of the yoke member 19 preferably with, for example, an adhesive agent. A shaft insertion hole 26, into which the shaft 8 is inserted, is defined in the center axis portion of the yoke member 19. The axes of the rotor 2 and the yoke member 19 coincide with the motor axis X such that each of the rotor 2, the yoke member 19, and the motor axis x are coaxial or substantially coaxial. The yoke member 19 is preferably made of a soft-magnetic material having a high magnetic permeability such as, for example, an electromagnetic steel plate. The yoke member 19 may have any shape as long as the outer circumferential surface thereof is formed into a cylindrical surface shape.

As shown in FIG. 2, the permanent magnet unit 25 preferably includes, for example, eight thick portions 27 where the air gap between the permanent magnet unit 25 and the stator 3 becomes smallest. The eight thick portions 27 are arranged at a regular or substantially regular interval in the circumferential direction. The permanent magnet unit 25 is circumferentially divided by the thick portions 27. In other words, the permanent magnet unit 25 is preferably defined by eight permanent magnet segments 28 arranged end to end in the circumferential direction of the rotor 2, for example. The eight permanent magnet segments 28 are preferably arranged to make close contact with one another. However, in FIG. 2, for the sake of clear illustration of details, small gaps are left between the respective permanent magnet segments 28.

The yoke member 19 preferably includes, for example, eight protrusions 29 arranged on the outer circumferential surface thereof. The protrusions 29 extend in a direction parallel or substantially parallel to the motor axis X. The protrusions 29 are preferably arranged at a regular or substantially regular interval in the circumferential direction. Grooves 31 arranged to engage with the protrusions 29 are defined on the inner circumferential surfaces of the respective permanent magnet segments 28. The respective permanent magnet segments 28 are preferably circumferentially positioned such that the grooves 31 and the protrusions 29 engage with each other. Alternatively, the protrusions 29 may be defined on the inner circumferential surfaces of the respective permanent magnet segments 28 with the grooves 31 defined on the outer circumferential surface of the yoke member 19.

The outer circumferential surface of the permanent magnet unit 25 (facing the stator 3) preferably includes portions magnetized with an N pole and portions magnetized with an S pole, which are alternately arranged in the circumferential direction. The borders between the N pole and the S pole of the permanent magnet unit 25 are arranged to coincide with the circumferential center positions of the respective permanent magnet segments 28 (indicated by double-dot chain lines in FIG. 2). In other words, the respective permanent magnet segments 28 are arranged such that the polarities of the outer circumferential surfaces thereof are inverted at the circumferential center positions as the borders. Taking the magnetizing errors into account, the borders between the magnetic poles are preferably deviated by, e.g., about ±2 degrees, from the circumferential center positions. The value indicative of the deviation amount of the borders between the magnetic poles is not intended to limit the present invention and can be changed as desired.

The permanent magnet segments 28 are manufactured preferably by grinding a sintered body molded into a specified shape and then magnetizing the sintered body thus ground. The magnetizing treatment of the permanent magnet segments 28 is performed preferably by bonding the sintered body to the outer circumferential surface of the yoke member 19 and applying magnetic fields to the sintered body in the radial direction. Accordingly, the polarities of the inner circumferential surfaces of the permanent magnet segments 28 (the surfaces bonded to the yoke member 19) are opposite to the polarities of the outer circumferential surfaces thereof (see FIG. 2).

Figure 4A:
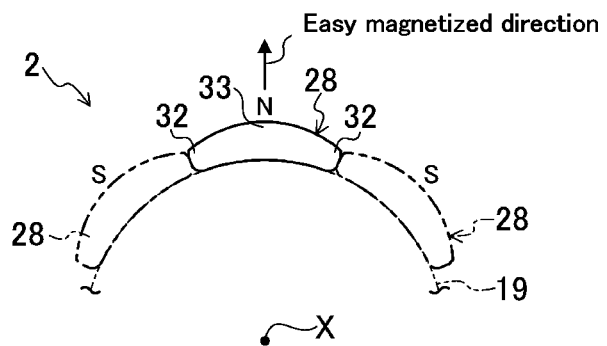
FIG. 4A is a schematic diagram explaining the easy magnetized direction of a permanent magnet unit included in a rotor of the conventional motor.
Figure 4B:
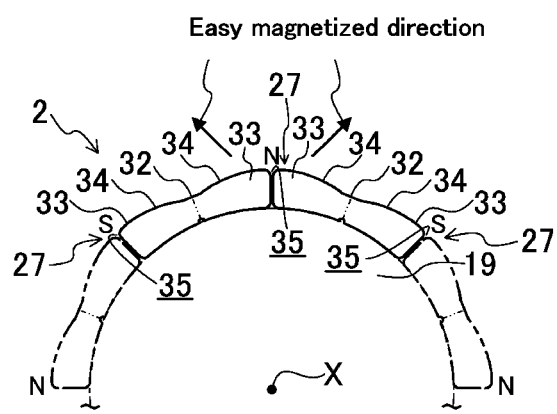
FIG. 4B is a schematic diagram explaining the easy magnetized directions of a permanent magnet unit included in the rotor of the brushless DC motor according to the first preferred embodiment.
Figure 5:
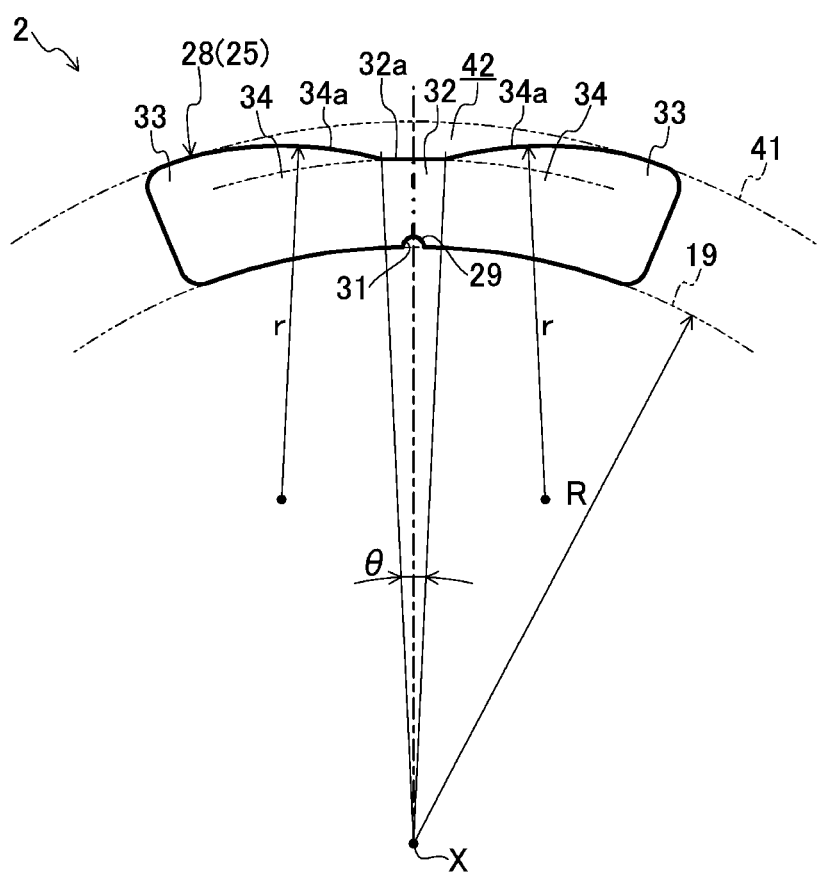
FIG. 5 is an enlarged view showing a permanent magnet segment.

As shown in FIG. 4B and in FIG. 5 on a larger scale, each of the permanent magnet segments 28 preferably includes a thinnest portion 32, a pair of thickest portions 33, and a pair of gradually changing portions 34. The thinnest portion 32 is positioned in the circumferential center portion of each of the permanent magnet segments 28 and is a portion where the radial thickness of each of the permanent magnet segments 28 becomes smallest. The thickest portions 33 are positioned in the circumferential opposite end portions of each of the permanent magnet segments 28 and are portions where the radial thickness of each of the permanent magnet segments 28 becomes greatest. The gradually changing portions 34 are positioned between the thinnest portion 32 and the thickest portions 33 and are portions where the radial thickness of each of the permanent magnet segments 28 is gradually increased from the thinnest portion 32 toward the thickest portions 33. The mutually adjoining end portions (the thickest portions 33) of the permanent magnet segments 28 make up the thick portions 27 of the permanent magnet unit 25. The permanent magnet segments 28 are magnetized such that the magnetic polarity centers thereof are positioned in the thick portions 27 (the borders between the permanent magnet segments 28). The four corner portions positioned in the circumferential opposite end portions of each of the permanent magnet segments 28 preferably have an arc shape. The apex portion of each of the thick portions 27 preferably has minute grooves 35 defined by the arc-shaped corner portions (see FIG. 4B).

The inner circumferential surface (the circumferentially extending surface on a radially inner portion) of each of the permanent magnet segments 28 has a cylindrical surface shape. The inner circumferential surface of each of the permanent magnet segments 28 has a shape conforming to the outer circumferential surface of the yoke member 19. On the other hand, the outer circumferential surface (radial outer surface) of each of the permanent magnet segments 28 is concentric with the outer circumferential surface of the yoke member 19 and is recessed radially inward from an imaginary cylindrical surface 41 (see FIG. 5) making contact with the outer circumferential surfaces of the thickest portions 33. A recess portion 42 is defined by the outer circumferential surface 32a of the thinnest portion 32 and the outer circumferential surfaces 34a of the gradually changing portions 34 positioned at the opposite sides of the thinnest portion 32 interposed therebetween.

When seen from the viewpoint of a phase angle about the center axis of the rotor 2 (namely, from the viewpoint of an electrical angle of the motor 1), the thinnest portion 32 is defined to occupy a predetermined angular extent θ whose center coincides with the circumferential center position of each of the permanent magnet segments 28. In the eight-pole motor 1 of the present preferred embodiment, the predetermined angular extent θ may preferably be, e.g., about ±4 degrees or more.

When seen in the direction of the motor axis X, the outer circumferential surface 32a of the thinnest portion 32 has an arc shape. The curvature center of the thinnest portion 32 coincides with the curvature center of the inner circumferential surface of each of the permanent magnet segments 28 (the outer circumferential surface of the yoke member 19).

The outer circumferential surfaces 34a of the gradually changing portions 34 are convex surfaces bulged outward. When seen in the direction of the motor axis X, the outer circumferential surfaces 34a of the gradually changing portions have an arc shape. The curvature centers of the outer circumferential surfaces 34a of the gradually changing portions 34 are deviated from the motor axis X. The curvature radius "r" of the gradually changing portions 34 is smaller than the curvature radius "R" of the inner circumferential surface of each of the permanent magnet segments 28.

Figure 6:
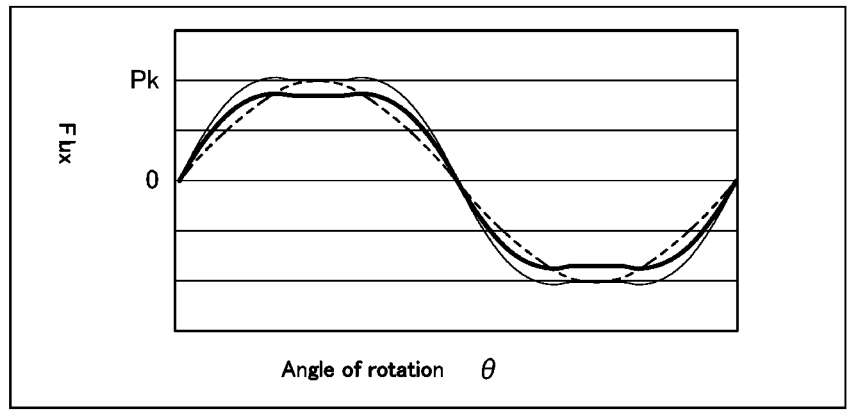
FIG. 6 is a graph explaining a magnetic flux waveform detected by a position detecting sensor.

In the conventional motor, the borders between magnetic poles coincide with the borders between the permanent magnet segments 28. Thus, the easy magnetized direction of the permanent magnet unit 25 is oriented radially outward from the magnetic pole center (see FIG. 4A). In the motor 1 of the present preferred embodiment, however, the easy magnetized directions of the permanent magnet unit 25 are oriented radially outward from the magnetic pole center and are angled circumferentially outward from the magnetic pole center (see FIG. 4B). In the conventional motor, the magnetic flux waveform detected by the position detecting sensor 9 is represented by: magnetic flux $\Phi = \sin \theta$ where the θ denotes the rotating angle or electrical angle of the rotor 2 (see a curve indicated by a double-dot chain line in FIG. 6). In the motor 1 of the present preferred embodiment, the magnetic flux waveform is represented by: magnetic flux $\Phi = \sin\theta + \alpha \sin 3\theta$ (see a curve indicated by a thick solid line in FIG. 6). While the peak value Pk of the magnetic flux is decreased in the motor 1 of the present preferred embodiment, it is possible to increase the tertiary component of the magnetic flux, thereby increasing the total magnetic flux. This makes it possible to enhance the output power of the motor 1 without incurring an increase in the cost of the motor 1.

In the equation noted above, the coefficient $\alpha$ is a value indicating the magnetic field strength of each of the permanent magnet segments 28. The coefficient $\alpha$ is set to fall within a range of from about 0.1 to about 0.16, for example, in the present preferred embodiment. By adjusting the magnetic field strength (i.e., the coefficient $\alpha$) of each of the permanent magnet segments 28, the peak value of the magnetic flux can be increased to the same level as that of the conventional motor as indicated by a thin solid line in FIG. 6. Accordingly, it is possible to increase the motor output power without significantly increasing the cost.

In the present preferred embodiment, the outer circumferential surface of each of the permanent magnet segments 28 is magnetized such that the border between the magnetic poles (the border between the N pole and the S pole) substantially coincides with the circumferential center position of each of the permanent magnet segments 28.

With this configuration, even if the bonding positions of the permanent magnet segments 28 with respect to the yoke member 19 deviate in the circumferential direction, no gap is generated in the border between the N pole and the S pole (at the changing point of the magnetic poles). The positional relationship between the N pole and the S pole in the circumferential direction is kept intact. Accordingly, regardless of the bonding accuracy of the permanent magnet segments 28 to the yoke member 19, the border between the N pole and the S pole can be accurately detected by the position detecting sensor 9.

In the motor 1 of the present preferred embodiment, the accuracy with which the border between the N pole and the S pole is detected by the position detecting sensor 9 depends on the magnetizing accuracy of the permanent magnet segments 28 and the shaping accuracy of the thinnest portion 32 rather than the bonding accuracy of the permanent magnet segments 28 to the yoke member 19. Since the magnetizing accuracy and the shaping accuracy are much higher than the bonding accuracy of the permanent magnet segments 28, it is possible to, as compared with conventional motors, increase the accuracy with which the border between the magnetic poles is detected by the position detecting sensor 9. This enables the control circuit to more accurately perform rotation control of the motor 1, eventually preventing rotational vibration of the motor 1, generation of noises and the like.

In the present preferred embodiment, when seen from the viewpoint of a phase angle about the center axis of the rotor 2 (namely, from the viewpoint of an electrical angle of the motor 1), the thinnest portion 32 of each of the permanent magnet segments 28 is arranged to occupy a predetermined angular extent $\theta$ (about ±2 degrees, in the present preferred embodiment) whose center coincides with the circumferential center position of each of the permanent magnet segments 28. The outer circumferential surface of the thinnest portion 32 is arranged into an arc shape concentric or substantially concentric with the outer circumferential surface of the yoke member 19 when seen in the direction of the motor axis X.

With this configuration, even if the border between the magnetic poles on the outer circumferential surface of each of the permanent magnet segments 28 is deviated circumferentially from the circumferential center position due to the magnetizing error, it is possible to prevent the magnetic flux waveform detected by the position detecting sensor 9 from being severely distorted near the border between the magnetic poles. Accordingly, it is possible to increase the accuracy with which the border between the magnetic poles is detected by the position detecting sensor 9.

First Modified Example

Figure 7:
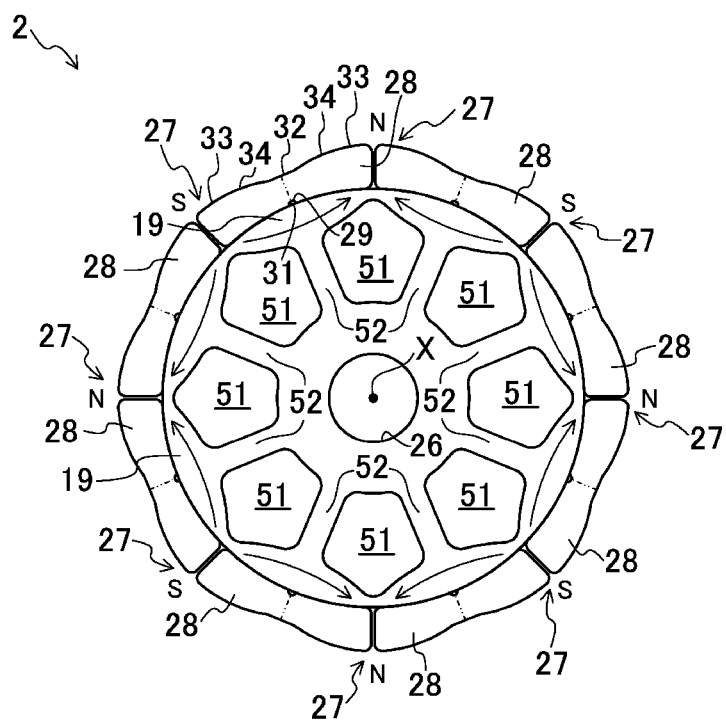
FIG. 7 is a view similar to FIG. 2, illustrating a first modified example of the first preferred embodiment of the present invention.

FIG. 7 illustrates a first modified example of the first preferred embodiment described above. In the first modified example illustrated in FIG. 7, the configuration of the yoke member 19 differs from that of the first preferred embodiment.

More specifically, in the present modified example, the yoke member 19 includes a plurality of through-holes 51 defined around the center axis thereof. The number of the through-holes 51 is eight which is equal to the pole number of the motor 1. Each of the through-holes 51 preferably has a substantially regular pentagon shape, for example. However, the shape of the through-holes 51 is not limited to the regular pentagon shape but may be, e.g., circular or square.

The eight through-holes 51 are arranged around the center axis of the yoke member 19 (the motor axis X) at a regular interval in an axial symmetry with one another. Extension portions 52 are provided between the mutually adjoining through-holes 51. The extension portions 52 interconnect the peripheral edge portion of the shaft insertion hole 26 and the outer circumferential portion of the yoke member 19. The number of the extension portions 52 is preferably eight in total. The eight extension portions 52 extend radially outward from the vicinity of the shaft insertion hole 26 of the yoke member 19. The rotational drive force of the stator 3 acting on the permanent magnet segments 28 is transferred from the outer circumferential portion of the yoke member 19 to the shaft 8 through the extension portions 52.

In this modified example, the configuration of the permanent magnet segments 28 is preferably the same as that of the first preferred embodiment. Accordingly, it is possible to obtain the same advantageous effects as obtained in the first preferred embodiment.

In this modified example, the circumferential center positions of the respective permanent magnet segments 28 lie on the extension lines of the respective extension portions 52. This makes it possible to greatly increase the thickness (radial thickness) of the sections of the outer circumferential portion of the yoke member 19 adjoining to the circumferential center portions of the respective permanent magnet segments 28. Accordingly, it is possible to secure sufficient magnetic paths in the circumferential center portions of the permanent magnet segments 28. As a consequence, it becomes possible to reduce the weight of the motor 1 while preventing reduction of the motor performance.

Second Modified Example

Figure 8:
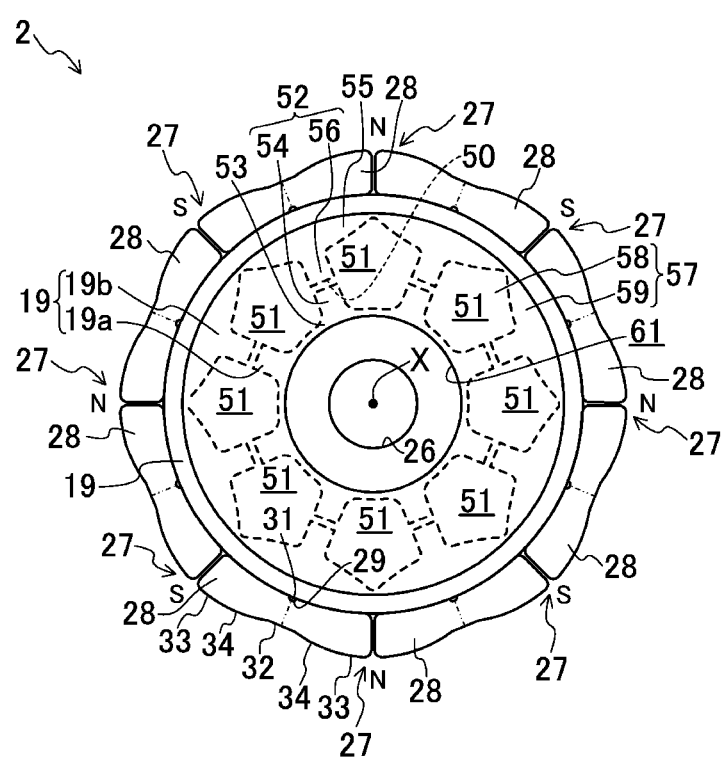
FIG. 8 is a view similar to FIG. 2, illustrating a second modified example of the first preferred embodiment of the present invention.

FIG. 8 illustrates a second modified example of the first preferred embodiment described above. In the second modified example illustrated in FIG. 8, the configuration of the yoke member 19 differs from that of the first modified example.

More specifically, the motor 1 of the present modified example differs from the motor of the first modified example in that the extension portions 52 arranged between the mutually adjoining through-holes 51 are divided into radial inner portions and radial outer portions.

By dividing the extension portions 52 in this manner, the yoke member 19 is divided into a radial inner yoke member 19a and a radial outer yoke member 19b.

The inner yoke member 19a preferably includes a central tube portion 53 and protrusions 54. The central tube portion 53 includes a shaft insertion hole 26. The protrusions 54 protrude radially outward from the outer circumferential surface of the central tube portion 53. The protrusions 54 are preferably provided in plural numbers (for example, eight, in the present modified example). The protrusions 54 are defined by the radial inner portions of the extension portions 52 divided as above.

The outer yoke member 19b preferably includes an outer circumferential tube portion 55 and protrusions 56. The permanent magnet segments 28 are bonded to the outer circumferential tube portion 55. The protrusions 56 protrude radially inward from the inner circumferential surface of the outer circumferential tube portion 55. The protrusions 56 are preferably provided in plural numbers (for example, eight, in the present modified example). The protrusions 56 are provided by the radial outer portions of the extension portions 52 divided as above.

The protrusions 54 of the inner yoke member 19a and the protrusions 56 of the outer yoke member 19b are arranged in a radially opposing relationship with each other. Clearance spaces 50 having a specified width are defined between the protrusions 54 and the protrusions 56.

The respective through-holes 51 communicate with one another through the clearance spaces 50. In the present modified example, the inner yoke member 19a and the outer yoke member 19b are united together preferably by filling, e.g., a thermoplastic resin 57 into the through-holes 51 and the clearance spaces 50 and then solidifying the thermoplastic resin 57. The protrusions 54 and 56 provided in the inner yoke member 19a and the outer yoke member 19b serve as detents arranged to prevent the inner yoke member 19a from making relative rotation in the circumferential direction with respect to the outer yoke member 19b.

The resin 57 preferably includes a filling portion 58 and annular plate portions 59. The filling portion 58 is filled into the through-holes 51 and the clearance spaces 50. The filling portion 58 has a columnar shape. The annular plate portions 59 are connected to the opposite end surfaces of the filling portion 58 in the direction of the motor axis X. The annular plate portions 59 are fixedly secured to the axial opposite end surfaces of the yoke member 19. Circular holes 61 arranged to expose the shaft insertion hole 26 of the yoke member 19 therethrough are defined in the central regions of the annular plate portions 59.

In the brushless DC motor 1 of the present modified example, while performing PWM control, an electric potential difference is generated between the bracket cover 7 and the stator core 16 whereby an electric current circulates through a route extending from the shaft 8 to the yoke member 19, the permanent magnet segments 28, the stator 3, the motor casing 6, the bracket cover 7, the bearing 11a, and then the shaft 8 (namely, a route indicated by a double-dot chain line in FIG. 1). This poses a problem in that the bearing 11a will damaged by electric corrosion.

In the present modified example, however, the yoke member 19 is divided into the inner yoke member 19a and the outer yoke member 19b. The resin 57 is filled between the inner yoke member 19a and the outer yoke member 19b (into the through-holes 51 and the clearance spaces 50). The resin 57 is an electrically insulating body. The resin 57 is preferably, for example, a thermoplastic. With this configuration, it is possible for the insulating body to interrupt the electric current that would otherwise flow through the yoke member 19, thereby preventing the bearing 11a from being electrically corroded.

In the second modified example, the inner yoke member 19a and the outer yoke member 19b preferably are united together by filling the thermoplastic resin 57 into the through-holes 51 and the clearance spaces 50. However, the present invention is not limited thereto. For example, an elastic material such as a thermosetting resin or a rubber material may be filled in place of the thermoplastic resin. If the elastic material is filled, it is possible to prevent the bearing 11a from being electrically corroded and to prevent generation of vibrations and noises during rotation of the motor 1.

In this modified example, the configuration of the permanent magnet segments 28 is preferably the same as that of the first preferred embodiment. Accordingly, it is possible to obtain the same advantageous effects as obtained in the first preferred embodiment.

Third Modified Example

Figure 9:
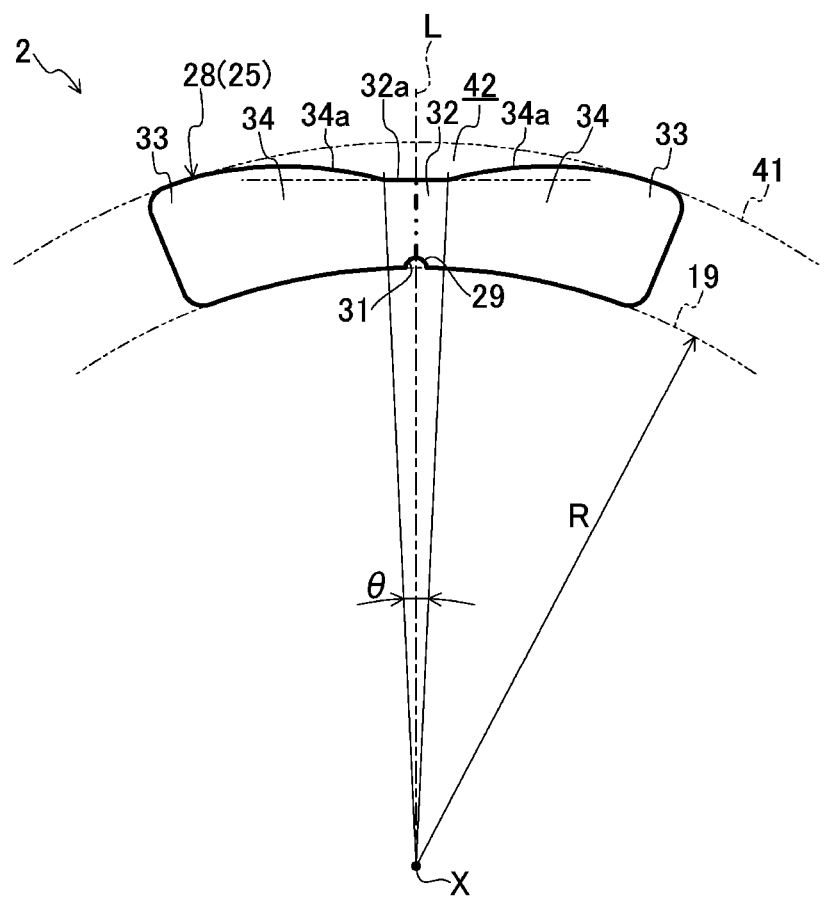
FIG. 9 is a view similar to FIG. 5, illustrating a third modified example of the first preferred embodiment of the present invention.

FIG. 9 illustrates a third modified example of the first preferred embodiment described above. In the third modified example illustrated in FIG. 9, the shape of the outer circumferential surface of the thinnest portion 32 differs from that of the first preferred embodiment and the foregoing modified examples.

More specifically, in the present modified example, the outer circumferential surface 32a of the thinnest portion 32 is preferably of a rectilinear shape when seen in the direction of the motor axis X. That is, the outer circumferential surface 32a is perpendicular or substantially perpendicular to a straight line L passing through the circumferential center position of each of the permanent magnet segments 28 and the center of the yoke member 19 when seen in the direction of the motor axis X.

With this configuration, just like the first preferred embodiment, even if the border between the magnetic poles on the outer circumferential surface of each of the permanent magnet segments 28 is circumferentially deviated from the circumferential center position due to the error in magnetizing the respective permanent magnet segments 28, there is no possibility or substantially no possibility that the magnetic flux waveform detected by the position detecting sensor 9 is severely distorted near the border between the magnetic poles.

Second Preferred Embodiment

Figure 10:
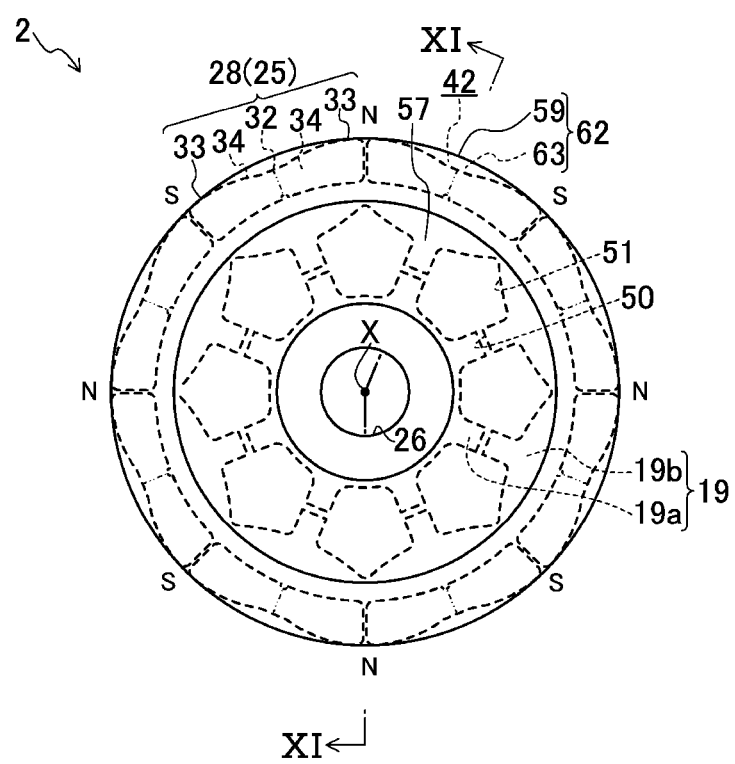
FIG. 10 is a view similar to FIG. 2, showing a rotor according to a second preferred embodiment of the present invention.
Figure 11:
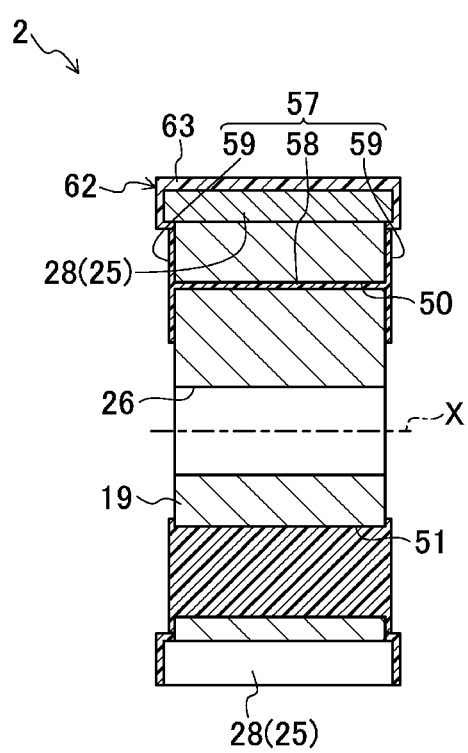
FIG. 11 is a section view taken along line XI-XI in FIG. 10.

FIGS. 10 and 11 show a second preferred embodiment of the present invention. The second preferred embodiment shown in FIGS. 10 and 11 differs from the first preferred embodiment in that there is provided an anti-scattering member 62 to prevent the permanent magnet segments 28 from scattering away. In the following description, the same components as those shown in FIGS. 2 and 3 are designated by like reference symbols and will not be described in detail, if appropriate.

The anti-scattering member 62 preferably is a one-piece member connected perpendicularly or substantially perpendicularly to the permanent magnet unit 25 and the yoke member 19 to define a single unitary structure preferably formed by, for example, a molding method using a resin material (or a molding resin).

The anti-scattering member 62 preferably includes a cladding portion 63. The cladding portion 63 covers the outer circumferential surface of the permanent magnet unit 25 excluding the thickest portions 33 of the respective permanent magnet segments 28, and the opposite end portions of the permanent magnet segments 28 and the yoke member 19 in the direction of the motor axis X. The cladding portion 63 fills the recess portions 42. The outer circumferential surface of the cladding portion 63 has a cylindrical surface shape. The curvature center of the outer circumferential surface of the cladding portion 63 coincides with the center axis of the yoke member 19. As can be seen in FIG. 11, the opposite end portions of the cladding portion 63 in the direction of the motor axis X are bent into a square shape. The cladding portion 63 covers the opposite end portions of the permanent magnet segments 28 in the direction of the motor axis X. The cladding portion 63 is fixedly secured to the opposite end surfaces of the yoke member 19.

In the present preferred embodiment, the configuration of the permanent magnet segments 28 is the same as that of the first preferred embodiment. Accordingly, it is possible to obtain the same advantageous effects as obtained in the first preferred embodiment.

In the present preferred embodiment, the outer circumferential surfaces of the respective permanent magnet segments 28 are pressed by the cladding portion 63 preferably made of, for example, a molding resin. This makes it possible to prevent the permanent magnet segments 28 from being scattered radially outward by a centrifugal force during rotation of the motor.

In the conventional motor 1 shown in FIG. 4A, each of the permanent magnet segments 28 includes a thickest portion 33 formed in the circumferential center portion thereof and a pair of thinnest portions 32 formed in the circumferential opposite end portions thereof. Therefore, when fixing the permanent magnet segments 28 with a molding resin, the resin is formed in the portions other than the thickest portion 33 (e.g., in the thinnest portions 32) in order to avoid any interference between the resin and the stator 3 or to secure magnetic characteristics. In this configuration, however, the molding resin is positioned in the borders between the respective permanent magnet segments 28 (see, for example, Japanese Patent Application Publication No. 2002-034188). This poses a problem in that it is difficult to achieve a sufficient anti-scattering effect and a problem in that burrs are generated in the molding resin.

In the motor 1 of the present preferred embodiment, the circumferential opposite end portions of each of the permanent magnet segments 28 become the thickest portions 33. Thanks to this feature, even if the molding resin is arranged in the portions other than the thickest portions 33, it is possible to position the molding resin in the circumferential center portions of the respective permanent magnet segments 28 and not in the borders between the permanent magnet segments 28. This makes it possible to obtain a sufficient anti-scattering effect while preventing generation of burrs in the molding resin.

The anti-scattering structure of the present preferred embodiment may be applied to the motor 1 including the inner yoke member 19a and the outer yoke member 19b according to the second modified example of the first preferred embodiment described above. In this case, the annular plate portions 59 and the anti-scattering member 62 may be provided independently of each other. Alternatively, the annular plate portions 59 and the anti-scattering member 62 may be formed as a single monolithic piece using the same resin material. This makes it possible to more strongly fix the yoke member 19 and the permanent magnet segments 28 together, thereby enhancing the anti-scattering effect and the effect of preventing rotation of the inner yoke member 19a and the outer yoke member 19b.

Third Preferred Embodiment

Figure 12:
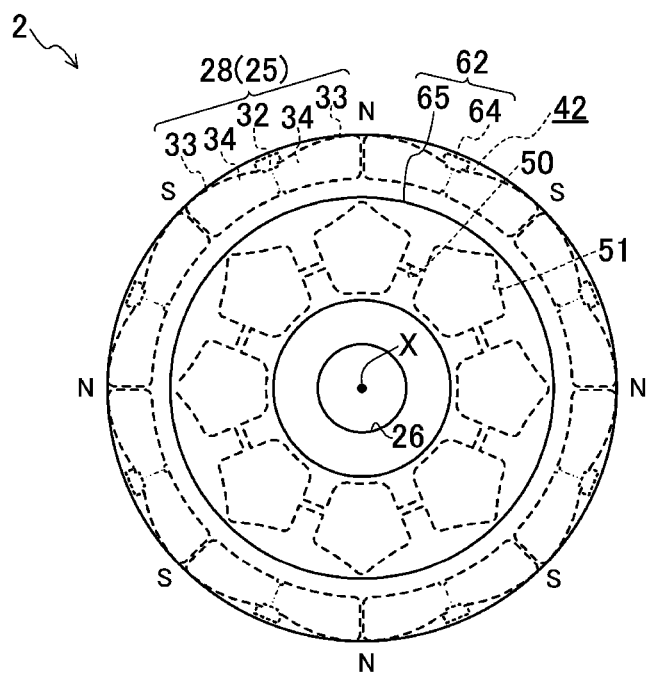
FIG. 12 is a view similar to FIG. 2, showing a rotor according to a third preferred embodiment of the present invention.
Figure 13:
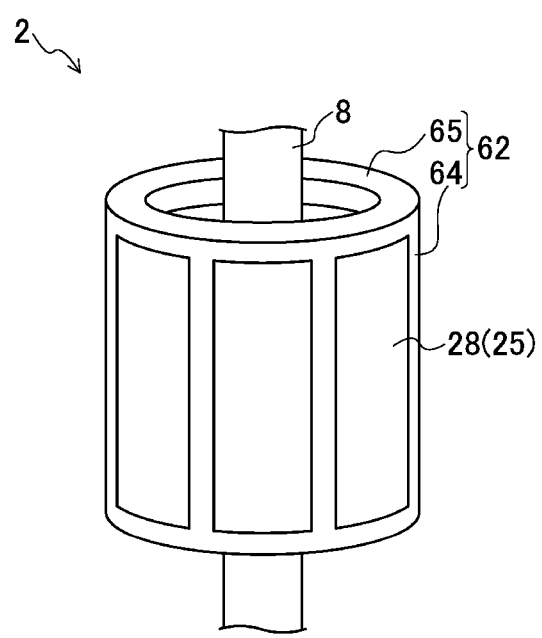
FIG. 13 is a perspective view of the rotor according to the third preferred embodiment of the present invention.

FIGS. 12 and 13 show a third preferred embodiment of the present invention. The third preferred embodiment shown in FIGS. 12 and 13 differs from the second preferred embodiment in terms of the configurations of the anti-scattering member 62 arranged to retain the permanent magnet segments 28.

More specifically, in the present preferred embodiment, the anti-scattering member 62 is preferably provided by a basket shaped member which is independent from the yoke member 19 and the permanent magnet segments 28. The anti-scattering member 62 preferably includes anti-scattering columns 64 and annular connecting portions 65. Each of the anti-scattering columns 64 are arranged radially outward of the thinnest portion 32 of each of the permanent magnet segments 28. The anti-scattering columns extend in the direction of the motor axis X. The anti-scattering columns 64 are provided in plural numbers. The annular connecting portions 65 are provided to interconnect the axial opposite end portions of the respective anti-scattering columns 64 and the yoke member 19.

Each of the anti-scattering columns 64 has a convex cross-sectional shape when seen in the axial direction of the rotor 2. The radial inner surface of each of the anti-scattering columns 64 is fixed to the outer circumferential surface 32a of the thinnest portion 32 of each of the permanent magnet segments 28. The anti-scattering columns 64 are arranged radially inward of an imaginary cylindrical surface 41 (see FIG. 5) making contact with the outer circumferential surfaces of the thickest portions 33. The total sum of the radial thickness of each of the anti-scattering columns 64 and the radial thickness of the thinnest portion 32 of each of the permanent magnet segments 28 is smaller than the radial thickness of the thickest portions 33 of each of the permanent magnet segments 28. In other words, the anti-scattering columns 64 are accommodated within the recess portions 42 of the permanent magnet segments 28. Alternatively, the total sum of the radial thickness of each of the anti-scattering columns 64 and the radial thickness of the thinnest portion 32 of each of the permanent magnet segments 28 may be set equal to the radial thickness of the thickest portions 33 of each of the permanent magnet segments 28.

The inner circumferences of the annular connecting portions 65 are fixed to the outer circumference of the yoke member 19. The outer circumferences of the annular connecting portions 65 are connected to the axial opposite end portions of the anti-scattering columns 64. The intermediate portions between the inner circumferences and the outer circumferences of the annular connecting portions 65 are fixed to the axial opposite end surfaces of the respective permanent magnet segments 28.

In the present preferred embodiment, the configuration of the permanent magnet segments 28 is the same as that of the first preferred embodiment. Accordingly, it is possible to obtain the same advantageous effects as obtained in the first preferred embodiment.

In the present preferred embodiment, the outer circumferential surfaces of the respective permanent magnet segments 28 are pressed by the anti-scattering columns 64. This makes it possible to prevent the permanent magnet segments 28 from being scattered radially outward by a centrifugal force during rotation of the motor.

In the case of conventional motors, the thickest portion 33 is arranged in the circumferential center portion of each of the permanent magnet segments 28 while the thinnest portions 32 are provided in the circumferential opposite end portions of each of the permanent magnet segments 28. Therefore, if the anti-scattering columns 64 are arranged in the thinnest portions 32 of the permanent magnet segments 28 in order to avoid interference with the stator 3, the anti-scattering columns 64 are positioned in the borders between the permanent magnet segments 28. For that reason, there is a need to press two permanent magnet segments 28 with one anti-scattering column 64. This poses a problem in that it is difficult to promise a sufficient anti-scattering effect.

In the motor 1 of the present preferred embodiment, the thinnest portion 32 is provided in the circumferential center position of each of the permanent magnet segments 28. Thanks to this feature, even if each of the anti-scattering columns 64 is arranged in the thinnest portion 32, it is possible to position each of the anti-scattering columns 64 in the circumferential center portion and not in the border between the permanent magnet segments 28. Accordingly, one permanent magnet segment 28 can be pressed by one anti-scattering column 64, which makes it possible to obtain a sufficient anti-scattering effect.

In the motor 1 of the present preferred embodiment, the anti-scattering member 62 can be attached to the rotor 2 by merely assembling the separate anti-scattering member 62 with the yoke member 19 and the permanent magnet segments 28. This eliminates the need to mold the anti-scattering member 62 with the yoke member 19 and the permanent magnet segments 28, which makes it possible to simplify the manufacturing process of the rotor 2.

A stronger anti-scattering structure can be provided by locking the permanent magnet segments 28 with the anti-scattering columns 64 and then including the molded anti-scattering member 62 of the second preferred embodiment.

Other Preferred Embodiments

The present invention is not limited to the preferred embodiments and the modified examples described above but may include various kinds of other configurations.

While eight-pole motors 1 including eight permanent magnet segments 28 have been described by way of example in the foregoing preferred embodiments, the present invention is not limited thereto. For example, the present invention may be applied to a four-pole motor 1 including four permanent magnet segments 28, a sixteen-pole motor 1 including sixteen permanent magnet segments 28, or a motor including any other desirable numbers of poles and permanent magnet segments. The number of the permanent magnet segments 28 and the number of the magnetic poles are not limited thereto (provided that the number of the magnetic poles is an even number greater than two).

While the protrusions 54 of the inner yoke member 19a and the protrusions 56 of the outer yoke member 19b preferably are opposed to each other in the first modified example, the present invention is not limited thereto. The protrusions 54 of the inner yoke member 19a and the protrusions 56 of the outer yoke member 19b may be out of alignment in the circumferential direction.

In the respective preferred embodiments and the modified examples described above, the motor 1 is preferably a so-called molded motor in which the stator 3 and the control board 10 are made as a single piece by, for example, being molded with the motor casing 6. However, it is not always necessary that the motor 1 be a molded motor. For example, the motor 1 may alternatively be a motor in which the stator 3 and the control board 10 are defined independently of the motor casing 6.

In the present invention, the respective preferred embodiments and the modified examples of the preferred embodiments described above can be combined arbitrarily.

The brushless DC motor of various preferred embodiments of the present invention includes a stator and a rotor arranged to be surrounded by the stator. The rotor of the brushless DC motor includes a yoke member having a cylindrical outer circumferential surface and a permanent magnet unit including a plurality of permanent magnet segments arranged on the outer circumferential surface of the yoke member in a mutually adjoining relationship in the circumferential direction. In particular, the brushless DC motor includes an anti-scattering member to prevent the permanent magnet segments from being scattered away.

While various preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A brushless DC motor, comprising:
a stator; and
a rotor including an outer circumferential surface surrounded by the stator, the rotor including:
a yoke member; and
a permanent magnet unit; wherein
the yoke member includes a cylindrical outer circumferential surface, the permanent magnet unit includes a plurality of permanent magnet segments arranged on the outer circumferential surface of the yoke member in a mutually adjoining relationship in a circumferential direction, each of the permanent magnet segments including a thinnest portion, thickest portions and gradually changing portions;
the thinnest portion is positioned in a circumferential center portion of each of the permanent magnet segments, each of the permanent magnet segments having a smallest thickness in the thinnest portion, the thickest portions are positioned in circumferential opposite end portions of each of the permanent magnet segments, each of the permanent magnet segments having a greatest thickness in the thickest portions;
the gradually changing portions are positioned between the thinnest portion and the thickest portions, each of the permanent magnet segments having a thickness gradually increasing from the thinnest portion toward the thickest portions;
the permanent magnet unit includes an outer circumferential surface that is magnetized such that an N pole and an S pole as magnetic poles are alternately arranged in a circumferential direction of the permanent magnet unit such that that a border between the magnetic poles is positioned in the circumferential center portion of each of the permanent magnet segments;
each of the plurality of permanent magnet segments is configured with different polarities on opposite circumferential ends thereof such that the polarities of adjacent ends of two directly adjacent ones of the plurality of permanent magnet segments have a same polarity; and the brushless DC motor further comprising:
  anti-scattering columns, each of the anti-scattering columns arranged radially outward of the thinnest portion of each of the permanent magnet segments and directly contacting all portions of the permanent magnet segments except for the thickest portions; and
  connecting portions arranged to fix opposite end portions of the anti-scattering columns to the yoke member.

2. The motor of claim 1, wherein each of the gradually changing portions includes an outer circumferential surface that is arc-shaped and protrudes outwardly when seen in an axial direction of the rotor.

3. The motor of claim 2, wherein the thinnest portion includes an outer circumferential surface that has an arc shape concentric or substantially concentric with the outer circumferential surface of the yoke member or a rectilinear shape when seen in the axial direction of the rotor.

4. The motor of claim 2, wherein, when seen from a viewpoint of a phase angle about a center axis of the rotor, the thinnest portion is arranged to occupy a predetermined angular extent whose center coincides a the circumferential center position of each of the permanent magnet segments.

5. The motor of claim 1, wherein the thinnest portion includes an outer circumferential surface that has an arc shape concentric or substantially concentric with the outer circumferential surface of the yoke member or a rectilinear shape when seen in an axial direction of the rotor.

6. The motor of claim 5, wherein, when seen from a viewpoint of a phase angle about a center axis of the rotor, the thinnest portion is arranged to occupy a predetermined angular extent whose center coincides with a circumferential center position of each of the permanent magnet segments.

7. The motor of claim 1, wherein, in a viewpoint of a phase angle about a center axis of the rotor, the thinnest portion is arranged to occupy a predetermined angular extent whose center coincides with a circumferential center position of each of the permanent magnet segments.

8. The motor of claim 1, further comprising:
  a shaft inserted into and fixed to the yoke member, the yoke member including an outer yoke member and an inner yoke member, the permanent magnet segments being fixed to an outer circumferential surface of the outer yoke member, the inner yoke member being arranged radially inward of the outer yoke member, the shaft being inserted into the inner yoke member, the outer yoke member and the inner yoke member being united together by a resin filled between the outer yoke member and the inner yoke member.

9. A brushless DC motor, comprising: a stator; and
a rotor having an outer circumferential surface surrounded by the stator, the rotor including:
  a yoke member; and
  a permanent magnet unit; wherein
the yoke member includes a cylindrical outer circumferential surface, the permanent magnet unit including a plurality of permanent magnet segments arranged on the outer circumferential surface of the yoke member in a mutually adjoining relationship in a circumferential direction;
each of the permanent magnet segments includes a thinnest portion, thickest portions, and gradually changing portions, the thinnest portion being positioned in a circumferential center portion of each of the permanent magnet segments;
each of the permanent magnet segments have a smallest thickness in the thinnest portion, the thickest portions being positioned in circumferential opposite end portions of each of the permanent magnet segments, each of the permanent magnet segments have a greatest thickness in the thickest portions;
the gradually changing portions are positioned between the thinnest portion and the thickest portions, each of the permanent magnet segments having a thickness gradually increasing from the thinnest portion toward the thickest portions;
the permanent magnet unit includes an outer circumferential surface magnetized such that an N pole and an S pole as magnetic poles are alternately arranged in a circumferential direction of the permanent magnet unit and such that a border between the magnetic poles is positioned in the circumferential center portion of each of the permanent magnet segments;
each of the gradually changing portions includes an outer circumferential surface that is arc-shaped and protrudes outwardly when seen in an axial direction of the rotor;
the thinnest portion includes an outer circumferential surface defined by an arc shape concentric or substantially concentric with the outer circumferential surface of the yoke member or a rectilinear shape when seen in the axial direction of the rotor, the thinnest portion being arranged to occupy a predetermined angular extent whose center coincides with a circumferential center position of each of the permanent magnet segments in a viewpoint of a phase angle about a center axis of the rotor;
a shaft is inserted into and fixed to the yoke member, the yoke member including an outer yoke member and an inner yoke member, the permanent magnet segments being fixed to an outer circumferential surface of the outer yoke member, the inner yoke member being arranged radially inward of the outer yoke member, the shaft being inserted into the inner yoke member;
the outer yoke member and the inner yoke member are united together by a resin filled between the outer yoke member and the inner yoke member;
each of the plurality of permanent magnet segments is configured with different polarities on opposite circumferential ends thereof such that the polarities of adjacent ends of two directly adjacent ones of the plurality of permanent magnet segments have a same polarity, and
the brushless DC motor further comprising:
  anti-scattering columns, each of the anti-scattering columns arranged radially outward of the thinnest portion of each of the permanent magnet segments and directly contacting all portions of the permanent magnet segments except for the thickest portions; and
  connecting portions arranged to fix opposite end portions of the anti-scattering columns to the yoke member.

* * * * *